(12) United States Patent
Smith et al.

(10) Patent No.: US 8,270,283 B2
(45) Date of Patent: Sep. 18, 2012

(54) TRANSMEDIAN STORAGE AND TRANSFER DEVICE

(76) Inventors: Jack V. Smith, Arden, NC (US); Ben T. Foster, Lutz, FL (US)

( * ) Notice: Subject to any disclaimer, the term of this patent is extended or adjusted under 35 U.S.C. 154(b) by 550 days.

(21) Appl. No.: 10/245,581

(22) Filed: Sep. 18, 2002

(65) Prior Publication Data

US 2004/0052164 A1    Mar. 18, 2004

(51) Int. Cl.
 *G11B 3/70*    (2006.01)
(52) U.S. Cl. .................. 369/272.1; 369/273; 369/13.05; 250/201.5; 720/718
(58) Field of Classification Search ............... 369/13.05, 369/103, 273, 275.3, 282, 280, 272.1, 112.01, 369/94, 44.23, 44.32, 44.29, 53.28, 275.1; 250/201.5; 720/718; 359/3; 259/22, 8, 30; 385/24, 37; 310/90.5; 711/137, 133
See application file for complete search history.

(56) References Cited

U.S. PATENT DOCUMENTS

| | | | | |
|---|---|---|---|---|
| 5,506,398 | A * | 4/1996 | Naruto ...................... | 250/201.5 |
| 5,592,462 | A * | 1/1997 | Beldock et al. ............... | 369/273 |
| 5,760,510 | A * | 6/1998 | Nomura et al. .............. | 310/90.5 |
| 5,887,090 | A * | 3/1999 | Rudolph et al. ............... | 385/24 |
| 6,101,009 | A * | 8/2000 | Linke et al. ..................... | 359/22 |
| 6,449,688 | B1 | 9/2002 | Peters et al. .................. | 711/112 |
| 6,449,689 | B1 | 9/2002 | Corcoran et al. ............ | 711/113 |
| 6,449,697 | B1 | 9/2002 | Beardsley et al. ........... | 711/137 |

OTHER PUBLICATIONS

David Stern, Teaching About Magnetism, Sep. 2004, (10 pages).
Internet (multiple sources) History of Magnetism, May 15, 2008, (10 pages).
Barry Hansen, Barry's Magnetic Levitation (2 pages); May 6, 2007, (2 pages).
http://en.wikipedia.org, Magnetic Levitation, Jan. 29, 2008, (wikipedia.org, 5 pages).
http://hyperphysics.phy-astr.gsu.edu, Magnetic Levitation, Jan. 29, 2008, (2 pages).
http://tesladownunder.com, Magnetic Levitation, Jan. 29, 2008, (9 pages).
Philip Gibbs & Andre Geim, Is Magnetic Levitation Possible, Mar. 2007, (3 pages).
http://en.wikipedia.org, Magnetism, Jan. 29, 2008, (8 pages).
http://www.fascinations.com, Photo-copy of Anti-Gravity (levitating) Globe package insert, Jan. 29, 2008, (1 page).

* cited by examiner

*Primary Examiner* — Ali Neyzari
(74) *Attorney, Agent, or Firm* — Nilay J. Choksi; Smith & Hopen, P.A.

(57) ABSTRACT

There is herein described a Transmedian Storage and Transfer Device (TSTD) that will provide a more useful system for information storage, retrieval, and computation. This is achieved by increasing the speed and storage capacity beyond that provided by existing computers and related systems. To obtain these benefits, the TSTD utilizes a spherical surface for information storage along with a system detector that can be point-like, line-like, or spherical. Further more, multiple spheres can be incorporated into the TSTD thus resulting in a sphere matrix.

13 Claims, 2 Drawing Sheets

TRANSMEDIAN STORAGE AND TRANSFER DEVICE

BACKGROUND OF THE INVENTION

1. Field of the Invention

The present invention is a method that is herein described as a Transmedian Storage and Transfer Device (TSTD) that will provide a more useful system for information storage, retrieval, and computation. This is achieved by increasing the speed and storage capacity beyond that provided by existing computers and related systems. To obtain these benefits, the TSTD utilizes a spherical surface for information storage along with a system detector that can be point-like, line-like, or spherical. Further more, multiple spheres can be incorporated into the TSTD thus resulting in a sphere matrix. The present art will improve the current technology by providing unexpected results as it relates to speed, convenience, security and information retrieval. The present art and novel new invention provides a completely new principle of operation for the storage and retrieval of data. In fact this novel new art provides unsuggested combination of old and antiquated technology that does not relate to the present art.

2. Description of the Related Art

The use of different types of storage devices and computers are well known in the art. It is known that the usefulness of a computer system is limited by the speed at witch its operations can be conducted and the amount of information that can be stored within the system. These limitations are the result of existing computer theory, design, and construction. In comparison to the human brain, it is possible for a large volume of information to be stored in various existing systems, however the information cannot be quickly retrieved or acted upon. And although many computer systems can operate quickly, the amount of information processed in those systems is relatively limited. To increase the speed of operation (storage, retrieval, and command execution), and to increase the information storage capacity, a new transmedian storage and transfer device (TSTD) has been designed. This novel and new invention overcomes previous limitations. The speed and storage capacity of this invention will allow for higher machine function. Ultimately, this invention may allow for data correlation and interpretation on levels approaching that of the human brain.

Current computer systems rely primarily upon rotating planer surfaces to effect information storage and retrieval. All of the prior art surfaces and systems are set up on linear and 2 dimensional surfaces and device concepts. The surface area of a flat planar surface is strictly limited to the two dimensional interface between the surface of the storage device (e.g. hard-drive disk, CD (compact disk), etc.) which is usually a limited circular flat surface that provides on average only surface area with the standard CD of approximately 2.5 cm. A small spherical transmedian device holds a multiple increase in surface area versus a flat planar surface. It is known in mathematics that a flat circular surface has a surface area defined by $\pi r^2$ and a spherical surface has a surface area defined by $4\pi r^2$. This means that a sphere has 4 times the surface area of a flat planar circular surface such as a CD. Spheres also do not have to have a hole in the center of it like a CD or hard drive so that it can be spun at a particular rpm. The spherical device would be a solid device with a smooth or non-smooth surface. These surfaces, which can either be magnetic or optical (disk or disc), rotate about a mostly fixed detector. Inherent limitations arise from the necessary interaction of the detector to the flat rotating surface containing the stored or to be stored information. To overcome these limitations, the TSTD utilizes a spherical surface for information storage. And the system's detector can either be point-like (such as that which is in common use today), or it can be line-like and circle the storage sphere, or it can be spherical in shape itself and surround or be enclosed within the storage sphere in the same manner. The detector can use reflectance in order to detect the data on the surface of the sphere, such that a beam from the detector strikes a particular point on the surface of the sphere and the beam is reflected back to the detector and the data is absorbed, detected, etc., by the detector. Other enhancements to the use of reflectance would be the use of a wide-angle lens attached to the detector or the detector completely encompassing the sphere such that it is completely enclosed. The use of multiple detectors placed on quadrants around the sphere would work and the enhancements such as wide-angle lenses would empower the detectors full coverage of the surface of the sphere. The preferred placement of the detector is adjacent to the outside of the storage sphere however; it can be placed within the sphere. In addition to the single storage sphere and detector system thus far described, more than one sphere and detector can be incorporated into the TSTD depending upon the speed and storage capacity desired for the system. A multiple sphere system (sphere matrix) can be constructed which may allow for even greater system function. Various combinations of storage spheres and detectors are possible. These combinations include multiple detectors per storage sphere, various placement of the detectors within or outside of any given storage sphere or spheres, and the incorporation of multiple detector types (point, line, or sphere) within any system. For example, one TSTD may utilize a storage sphere surrounded by a detector sphere which has one or more detector points operating on its outside. Yet another variation of the TSTD may utilize a single point detector proximally placed between two storage spheres. Many variations are possible with this TSTD invention. Some variations have greater potential than others.

Different attempts at providing an effective storage have been developed using the same planar surface approach. No prior are found or ever will be found can described the present arts novelty. However for discussion purposes the following systems are in the same field but have no relative bearing on the present art. U.S. Pats. No. 6,449,697 is a patent for pre staging data into cache in preparations for data transfer operations and has nothing to do with the present art and does not teach a sphere for the storage of data, a magnetic filed for use, a spherical detector system that encompasses the data sphere, etc. This prior art has nothing to do with the present art. U.S. Pat. No. 6,449,688 is a device for the process of transferring streams of data between multiple storage units and multiple applications in a scalable and reliable manner. This again, uses old antiquated linear technology and thought, and does not teach or even elude to the novelty of the present art, this art does not teach a sphere for the storage of data, a magnetic filed for use, a spherical detector system that encompasses the data sphere, etc. U.S. Pat. No. 6,449,689 does teach the storing of compressed data on a hard disk drive, but again, this antiquated technology and thought does not have anything to do with the advancement in the art the present device does. In addition this art does not teach a sphere for the storage of data, a magnetic filed for use, a spherical detector system that encompasses the data sphere, etc.

While the prior art provides methods for the storage of data, its maximum capacity for storage on a DVD is 8.5 MB of data. On a spherical surface it would be 4 times that amount as a minimum with a smooth surface (in the neighborhood of 34 MB). This is purely for illustration purposes only. The technology (preset art) is so new that it brings about a basic paradigm shift in thought with regards to the storage of data. All of the prior art suffer from the limited one to two dimensional surface areas when dealing with a flat circular planar surface, there are additional drawbacks but need not be mentioned now. These are just some, but not all, of the limitations of the prior art.

SUMMARY OF THE INVENTION

The present invention is designed to advance the art of data storage and retrieval past the prior arts drawbacks and provide a marked in improvement in the art. The present art requires minimal number of parts, increases speed and is cost effective. Another object of the present invention is to provide a method that allows for an easily adaptable method of use and is fully enabled.

The primary object of the present invention is to provide a more useful system for information storage, retrieval, and computation. This is achieved by increasing the speed and storage capacity beyond that provided by current computer systems while at the same time maintaining a device size that is generally consistent with the common use of existing computers. A secondary object of the present invention is to provide a system that could or may be powerful enough to allow for higher levels of information correlation and interpretation.

The act of storing information on the TSTD storage sphere can be achieved magnetically, optically, or by some other means. The sphere can float within a magnetic field, or other repulsion or attraction median, or within a fluid or liquid, or be held or supported by connective mounts that allow for up to a full three axes motion of the sphere itself, or it can be held or supported by any combination of these. The TSTD detector can float within a magnetic field, or other repulsion or attraction median, or within a fluid or liquid, or be held or supported by connective mounts that allow for up to a full three axes motion of the detector itself, or it can be held or supported by any combination of these. For each storage sphere or detector that may be added to or comprise the system (a sphere matrix), they also can float within a magnetic field, or other repulsion or attraction median, or within a fluid or liquid, or be held or supported by connective mounts that allow for up to a full three axes motion of the items themselves, or they can be held or supported by any combination of these. As previously explained in exacting detail the current computer systems rely primarily upon rotating planer surfaces to effect information storage and retrieval. All of the prior art surfaces and systems are set up on linear and 2 dimensional surfaces and devices concept. The surface area of a flat planar surface is strictly limited to the two dimensional interface between the surface of the storage device (e.g. hard-drive disk, CD (compact disk), etc.) which is usually a limited circular flat surface that provides on average only surface area with the standard CD of approximately 2.5 cm. A small spherical transmedian device holds a multiple increase in surface area versus a flat planar surface. It is known in mathematics that a flat circular surface has a surface area defined by $\pi r^2$. A sphere has a surface area defined by $4\pi r^2$. Thus a sphere represents 4 times the surface area of a flat planar circular surface such as a CD. For starters spheres do not have to have a hole in the center of it like a CD or hard drive so that it can be spun at a particular rpm. The spherical device would be a solid device with a smooth or non-smooth surface. These surfaces, which can either be magnetic or optical (disk or disc), rotate about a mostly fixed detector. Inherent limitations arise from the necessary interaction of the detector to the flat rotating surface containing the stored or to be stored information. To overcome these limitations, the TSTD utilizes a spherical surface for information storage. And the system's detector can either be point-like (such as that which is in common use today), or it can be line-like and circle the storage sphere, or it can be spherical in shape itself and surround or be enclosed within the storage sphere in the same manner. The detector can use reflectance in order to detect the data on the surface of the sphere, such that a beam from the detector strikes a particular point on the surface of the sphere and the beam is reflected back to the detector and the data is absorbed, detected, etc., by the detector. Other enhancements to the use of reflectance would be the use of a wide-angle lens attached to the detector or the detector completely encompassing the sphere such that it is completely enclosed. The use of multiple detectors placed on quadrants around the sphere would work and the enhancements such as wide-angle lenses would empower the detectors full coverage of the surface of the sphere. The preferred placement of the detector is adjacent to the outside of the storage sphere however; it can be placed within the sphere. In addition to the single storage sphere and detector system thus far described, more than one sphere and detector can be incorporated into the TSTD depending upon the speed and storage capacity desired for the system. A multiple sphere system (sphere matrix) can be constructed which may allow for even greater system function. Various combinations of storage spheres and detectors are possible. These combinations include multiple detectors per storage sphere, various placement of the detectors within or outside of any given storage sphere or spheres, and the incorporation of multiple detector types (point, line, or sphere) within any system. For example, one TSTD may utilize a storage sphere surrounded by a detector sphere which has one or more detector points operating on its outside. Yet another variation of the TSTD may utilize a single point detector proximally placed between two storage spheres. Many variations are possible with this TSTD invention. Some variations have greater potential than others. Depending upon the TSTD detector desired for use (point, line, reflectance, multiple or spherical), the storage and retrieval of information (the transfer of data) from the TSTD could be from any direction of the device at any point, or from all points and orientations simultaneously. The ability to acquire data from a much larger pool is an advancement of an unrecognized solution to a problem such as limited data storage and retrieval. And this transfer can occur sequentially or simultaneously. The only computer that can currently come anywhere near this ability is the human brain. The present art will give the ability to computer, robots, androids and the like to achieve the unthinkable, process information at the speed of the human brain.

The benefits provided by the TSTD invention described thus far include increased operational speed and increased storage capacity. The larger surface area of the sphere affords the improved storage capacity over that of the common planner disk. The improved speed is afforded by the ease that data storage and retrieval can be conducted due to the interaction of the detector with the storage sphere. More specifically, it is the ability of the detector and storage sphere to move in a greater relative motion to one another and to cover a greater surface area in less time that results in the increased operating speed.

To affect a relative motion or non-motion of the detector to the sphere can be accomplished by electrical, magnetic, or mechanical means. For example, the data sphere (in this example metallic, but can be made out of any suitable material that can be used to store data) is surrounded by a metal (magnetic) cover that is controlled by electricity (e.g. that when manipulated can determine the amount and position of the data sphere relative to the outer detector and the data sphere is controlled by an electrical current applied to the outer shell of the outer (detector) sphere. This would allow the manipulation of the sphere to orient it to any particular point relative to the inside surface of the detector (outer shell). The detector in this example could be made up of 4 individual detectors (but could be as many as one, thousands or more) that can detect reflectance, light, etc., that are placed perpendicular to each other in such a manner to give the detector(s) full coverage of the data sphere using fish-eye or some other curved lens. In addition the detector(s) can use laser, diodes, fiber optics or some other mode for the transmittal of data in the form of electrical pulses that were converted from light that is reflected or otherwise from light energy to electrical form the surface of the data sphere within the transmedian device.

The present example of the invention provides a method of data storage and or retrieval that allows the use of a single data sphere inside of a magnetic spherical detector that encompasses the internal data sphere as defined above, and the method being characterized by the following steps:
 a) enclosing a data sphere with an external detector sphere;
 b) the data sphere is made up of a material that stores data and can be manipulated within a magnetic field;
 c) the external sphere detector sphere is made up of a material that can exert a magnetic field with the use of electricity or some other form of energy;
 d) the detector has 4 detectors (in this example light detectors) that are perpendicular to each other;

Other aspects and advantages of the present invention appear more clearly from reading the following detailed description of the preferred embodiment of the invention, given by way of example and made with reference to the accompanying drawings. Such as the determination of the shape and orientation of the spheres to each other, etc. A thorough search of the literature reveals no relative art resembling this technology; therefore, this invention is clearly a novel in creation, and is not obvious to anyone skilled in the art, there are certain aspects of the present art that can be found in the prior art but no prior art has advanced the art of data storage/retrieval as much as the present art. This art solves an unrecognized problem that was never before even recognized. Specifically this novel art allows for the user the unexpected results of increasing memory storage and retrieval exponentially. This was never conceived until the present art and advances the art significantly. In fact the prior art as cited teach away from the present art in that it teaches the use of flat planar surfaced for the storage of data, the use of single detectors, circular surfaces not spherical, etc.

BRIEF DESCRIPTION OF THE DRAWINGS

Other objects, features and advantages of the invention will become obvious from the following detailed description of the invention when taken in conjunction with the accompanying drawings, in which.

DETAILED DESCRIPTION OF THE PREFERRED EMBODIMENTS

The present invention will now be described more fully with reference to the accompanying drawings, in which the preferred embodiments of the present art invention are shown. It is understood from the embodiments that a person skilled in the art may make variations and modifications without departing from the spirit and scope of the invention. Such as changing the size or shape of the sphere from a pure round sphere to an oblong sphere, etc., the use of one or more detectors, the surface of the device, the materials that the device is made from, etc.

Figure 1:
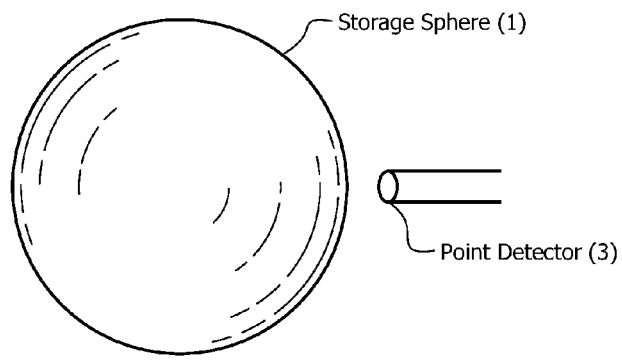
FIG. 1 is a plan view of a storage (data) sphere using a point detector according to the present invention.
Figure 2A:
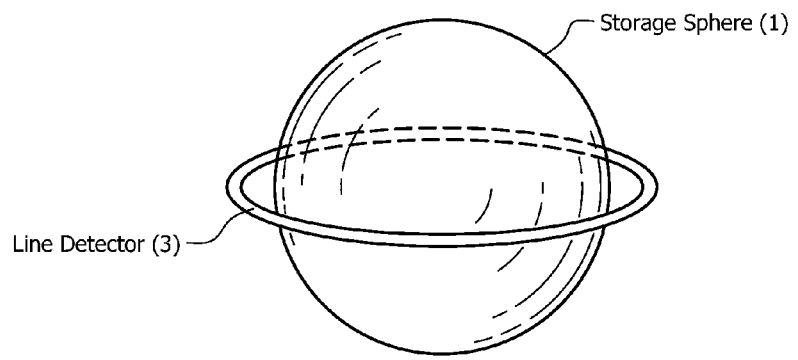
FIG. 2A is a perspective view of a storage (data) sphere using a line detector according to the present invention.
Figure 2B:
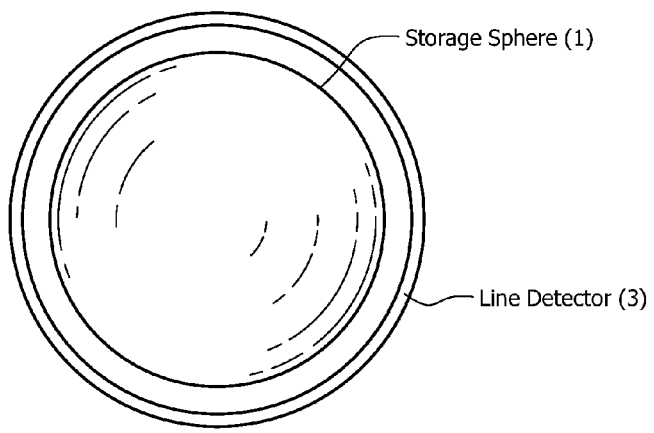
FIG. 2B is a top view of the storage (data) sphere of FIG. 2A using a line detector.
Figure 3:
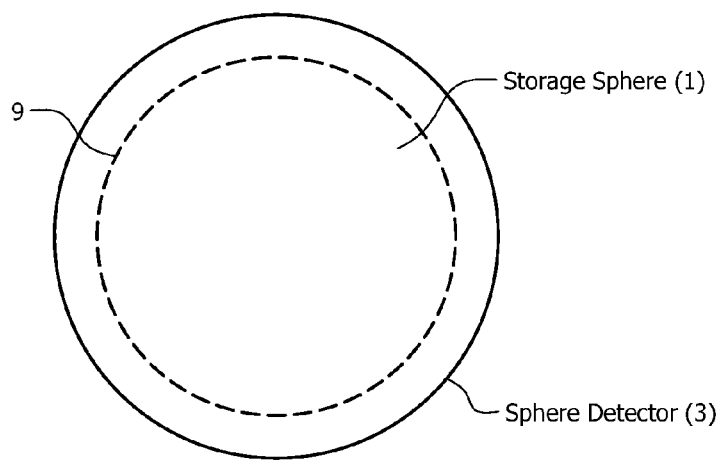
FIG. 3 is a plan view of a storage (data) sphere using a sphere detector according to the present invention.

Referring now to the drawings and in particular FIG. 1 is a plan view of one embodiment of the storage (data) sphere 1 that is used for storage and retrieval of data and the detector (point) 3. FIG. 1 shows a single storage sphere 1 and a single point-like detector 3 (one that is in common use today). Data transfer to and from the storage sphere 1 occurs at the "point" of the detector 3. FIG. 2A shows a single storage sphere 1 and a single line-like detector 3. Data transfer to and from the storage sphere 1 can occur along the entire length of the "line" of the detector 3. In FIG. 2B a top view of the storage (data) sphere of FIG. 2A using a line detector 3 is clearly illustrated. FIG. 3 is a top view of a storage (data) sphere 1 using a pulse detector 3. The dashed lines 9 as illustrative of this type of detector 3 are further illustrated by the dashed lines 9 that surround the sphere 1. The dashed lines 9 represent the pulsing of the pulse detector 3.

Figure 4:
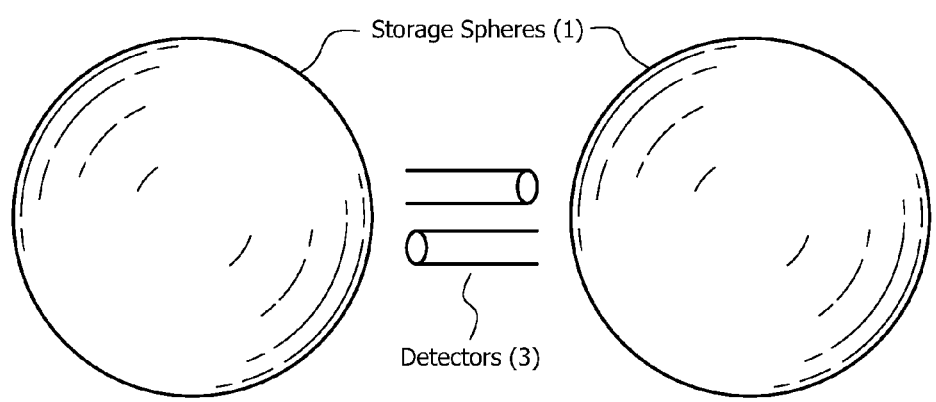
FIG. 4 is a plan view of two storage (data) spheres relative to two detectors.

Therefore, FIG. 3 shows a single storage sphere 1 and a single sphere-like detector 3. Data transfer to and from the storage sphere 1 can occur along the entire surface of the sphere of the detector 3. FIG. 4 is a plan view of two storage spheres 1 relative to the detectors 3. FIG. 4 illustrates an example of TSTD comprised of two point detectors 3 that are positioned between two storage spheres 1. An embodiment of the current invention can further include detectors 3, power supply line (not shown) for the magnetic field which can be filled with fluid or empty or under a vacuum or pressure, detector lens (curved) (not shown) and detector connection line (not shown). It is contemplated that the detectors 3 can provide complete coverage of the whole sphere 1. Therefore the device provides a full coverage for all of the information available on the surface of the sphere 3. An embodiment can further include the power supply line (electrical current for example) (not shown) for the magnetic field which can be filled with fluid or other substance or empty or under a vacuum or pressure, the detector lens (curved) (not shown), and the detector connection line (not shown). To affect a relative motion or non-motion of the detector 3 to the sphere 1 can be accomplished by electrical, magnetic, or mechanical means. For example, the data sphere 1 (in this example metallic, but can be made out of any suitable material that can be used to store data) is surrounded by a metal (magnetic) cover 3 (detector) that is controlled by electricity (e.g. that when manipulated can determine the amount and position of the data sphere 1 relative to the outer detector 3 and the data sphere 1 is controlled by an electrical current 6 applies to the outer shell of the outer (detector) sphere 3. This would allow the manipulation of the sphere 1 to orient it to any particular point relative to the inside surface of the detector(s) (outer shell). The detector 3 in this example could be made up of 4 individual detectors 3 (but could be as many as one, thousands or more) that can detect reflectance, light, etc., that are placed perpendicular to each other in such a manner to give the detector(s) 3 full coverage of the data sphere 1 using fish-eye 5 or some other curved lens 5. In addition the detector(s) 3 can use laser, diodes, fiber optics or some other mode for the transmittal of data in the form of electrical pulses that were converted from light that is reflected or otherwise from light energy to electrical form the surface of the data sphere 1 within the transmedian device.

The present example of the invention provides a method of data storage and or retrieval that allows the use of a single data sphere inside of a magnetic spherical detector that encompasses the internal data sphere as defined above, and the method being characterized by the following steps:

e) enclosing a data sphere with an external detector sphere;
f) the data sphere is made up of a material that stores data and can be manipulated within a magnetic field;
g) the external sphere detector sphere is made up of a material that can exert a magnetic field with the use of electricity or some other form of energy;
h) the detector has 4 detectors (in this example light detectors) that are perpendicular to each other;

The simplicity and novelty of the invention is unmatched in the art. This device could be easily manipulated to increase the data and storage capacity of any system. This invention is going to save the mankind, the world, computer industry and users billions to trillions of dollars in by increasing the storage and retrieval of data, increasing the speed at which data can be accessed, and improving technology and life as a minimum.

To further explain in a brief and concise way the present art is a method for data storage and retrieval using a sphere and detector wherein the following is required;

a. a sphere with an external detector;
b. the above mentioned sphere is made up of a material that stores data and can be manipulated within a magnetic field or by other mechanical or electrical means;
c. the detector can be a line, pulse, point, spherical, or multiple that can convert light or other energy to electrical pulses that can be interpreted by a computer or other device as data or code.

The invention has been described in detail with particular reference to a preferred embodiment and the operation thereof and it is understood that variations, modifications, and substitution of equivalent means can be effected and still remain within the spirit and scope of the invention. And all such modifications and variations are to be included within the scope of the invention as defined in the appended claims.

That which is claimed is:

1. A data storage and retrieval system, comprising:
   a storage sphere suspended in a magnetic field, said storage field having data stored on a surface of said storage sphere, said storage sphere used to store and retrieve data, said surface of said storage sphere irradiating reflected light;
   an external detector for retrieving said data stored on said surface of said storage sphere, said detector disposed in proximity to said storage sphere, said proximity allowing said detector to detect said reflected light and convert said reflected light to electrical pulses; and
   a storage system in electrical communication with said detector, said storage receiving and interpreting said electrical pulses generated by said detector as data or code.

2. A data storage and retrieval system as in claim 1, further comprising:
   a metal cover for controlling a spatial relationship between said surface of said storage sphere and said external detector, said metal cover disposed in overlying relation to said storage sphere.

3. A data storage and retrieval system as in claim 1, further comprising:
   said storage sphere having an orientation manipulated by a magnetic field.

4. A data storage and retrieval system as in claim 1, further comprising:
   said external detector being a single point detector.

5. A data storage and retrieval method, comprising the steps of:
   storing data on a surface of a storage sphere, said storage sphere suspended in a magnetic field;
   irradiating light energy from said surface of said storage sphere;
   reflecting said light energy off an external detector disposed in proximity to said storage sphere;
   retrieving said data stored on said surface of said storage sphere using said external detector, said external detector detecting said reflected light energy and converting said reflected light energy to electrical impulses containing said data.

6. A data storage and retrieval method as in claim 5, further comprising the step of:
   transferring said electrical impulses from said external detector to a storage system for interpretation as said data.

7. A data storage and retrieval method as in claim 5, further comprising the step of:
   disposing a metal cover in overlying relation to said storage sphere;
   applying an electrical current to said metal cover, causing manipulation of said metal cover; and
   controlling a spatial relationship between said surface of said storage sphere and said external detector as a result of said manipulation of said metal cover.

8. A data storage and retrieval method as in claim 5, further comprising the step of:
   manipulating an orientation of said storage sphere using a magnetic field.

9. A data storage and retrieval system as in claim 1, further comprising:
   said external detector being a line detector.

10. A data storage and retrieval system as in claim 1, further comprising:
    said external detector being a spherical detector.

11. A data storage and retrieval method as in claim 5, further comprising:
    said external detector being a single point detector.

12. A data storage and retrieval method as in claim 5, further comprising:
    said external detector being a line detector.

13. A data storage and retrieval method as in claim 5, further comprising:
    said external detector being a spherical detector.

* * * * *